US012741673B2

(12) United States Patent
Albin Rajasingham et al.

(10) Patent No.: US 12,741,673 B2
(45) Date of Patent: Sep. 22, 2026

(54) AUTONOMOUS VEHICLE USING HETEROGENEOUS REDUNDANCY CHECKS

(71) Applicant: EMBOTECH AG, Zürich (CH)

(72) Inventors: Thivaharan Albin Rajasingham, Zürich (CH); Alexander Domahidi, Zürich (CH); Stefano Longo, Zürich (CH)

(73) Assignee: EMBOTECH AG, Zürich (CH)

( * ) Notice: Subject to any disclaimer, the term of this patent is extended or adjusted under 35 U.S.C. 154(b) by 73 days.

(21) Appl. No.: 18/781,454

(22) Filed: Jul. 23, 2024

(65) Prior Publication Data

US 2025/0033667 A1 Jan. 30, 2025

(30) Foreign Application Priority Data

Jul. 28, 2023 (EP) .................................... 23188480

(51) Int. Cl.
*B60W 60/00* (2020.01)

(52) U.S. Cl.
CPC .... *B60W 60/0011* (2020.02); *B60W 60/0015* (2020.02); *B60W 2420/403* (2013.01);
(Continued)

(58) Field of Classification Search
CPC ......... B60W 60/0011; B60W 60/0015; B60W 2420/403; B60W 2420/408
See application file for complete search history.

(56) References Cited

U.S. PATENT DOCUMENTS 9,261,379 B1 * 2/2016 Chatham ............ G08G 1/09626
9,672,734 B1 * 6/2017 Ratnasingam ... G08G 1/096741
(Continued)

FOREIGN PATENT DOCUMENTS

DE 102021112349 A1 * 11/2021 ............ G06F 17/18

OTHER PUBLICATIONS

"The Extended Search Report and Written Opinion" for Application No. EP23188480.0-1205, dated Nov. 2, 2023, 7 pages.
(Continued)

*Primary Examiner* — Redhwan K Mawari
(74) *Attorney, Agent, or Firm* — Mannava & Kang, P.C.

(57) ABSTRACT

The invention is notably directed to an autonomous vehicle, e.g., an autonomous or semi-autonomous vehicle such as a self-driving car. The autonomous vehicle comprises a drive-by-wire (DbW) system (300), a set of perception sensors 21-24, such as lidars and cameras, and two processing systems, i.e., a first processing system (100) and a second processing system (200). The first processing system is configured to form a main perception based on signals from each of the perception sensors of the set, estimate states of the vehicle based on feedback signals from the DbW system, and compute trajectories for the autonomous vehicle based on the perception formed and the estimated states. The second processing system is configured to form an auxiliary perception based on signals from only a subset of the perception sensors, validate the computed trajectories based on the auxiliary perception formed, and cause to forward the validated trajectories to the DbW system. In other words, distinct perceptions are formed from overlapping sets of sensors, whereby one of the perceptions formed is used to validate trajectories obtained from the other. This requires less computational efforts, inasmuch as less signals (and therefore less information) are required to form the auxiliary perception. However, doing so is more likely to allow inconsistencies to be detected, thanks to the heterogeneity of sensor signals considered in input to the main and auxiliary perceptions. The invention is further directed to related methods and computer program products.

19 Claims, 7 Drawing Sheets

(52) U.S. Cl.
CPC ... *B60W 2420/408* (2024.01); *B60W 2520/10* (2013.01); *B60W 2556/10* (2020.02)

(56) References Cited

U.S. PATENT DOCUMENTS

| | | | | |
|---|---|---|---|---|
| 9,784,592 | B2 * | 10/2017 | Gupta | B60W 30/00 |
| 10,303,178 | B1 * | 5/2019 | Gutmann | B60W 30/09 |
| 10,955,842 | B2 | 3/2021 | Zeng et al. | |
| 11,106,218 | B2 * | 8/2021 | Levinson | G05D 1/2249 |
| 11,164,450 | B2 * | 11/2021 | Tsfasman | G08G 1/0116 |
| 11,379,995 | B2 * | 7/2022 | Ning | G06V 20/52 |
| 11,390,300 | B2 * | 7/2022 | Phillips | B60W 60/00276 |
| 2007/0159354 | A1 * | 7/2007 | Rosenberg | G08G 1/0965 340/902 |
| 2014/0129128 | A1 * | 5/2014 | Haran | G01S 5/04 701/300 |
| 2016/0260328 | A1 * | 9/2016 | Mishra | G01S 13/931 |
| 2020/0365029 | A1 * | 11/2020 | Kourous-Harrigan | G08G 1/167 |
| 2021/0108936 | A1 * | 4/2021 | Seegmiller | B60W 60/00276 |
| 2021/0253128 | A1 * | 8/2021 | Nister | B60W 50/0097 |
| 2021/0354690 | A1 * | 11/2021 | Yershov | G06V 20/56 |
| 2022/0020158 | A1 * | 1/2022 | Ning | G06T 7/277 |
| 2022/0176995 | A1 * | 6/2022 | Subramanian | B60W 30/08 |
| 2022/0324469 | A1 * | 10/2022 | Ye | G06V 20/58 |
| 2022/0379928 | A1 * | 12/2022 | Varnhagen | B60W 60/0011 |
| 2023/0192139 | A1 | 6/2023 | Kumavat et al. | |
| 2023/0288568 | A1 * | 9/2023 | Heo | G01S 17/58 |

OTHER PUBLICATIONS

"Communication about intention to grant a European patent" for Application No. EP 23188480.0, dated Feb. 9, 2026, 46 pages.

* cited by examiner

AUTONOMOUS VEHICLE USING HETEROGENEOUS REDUNDANCY CHECKS

PRIORITY

The present application claims priority under 35 U.S.C. 119(a)-(d) to European Patent Application number EP 23 188 480.0, having a filing date of Jul. 28, 2023, the disclosure of which is hereby incorporated by reference in its entirety.

TECHNICAL FIELD

The invention relates in general to the fields of autonomous vehicles, methods of driving autonomous vehicles, and computer program products for driving autonomous vehicles. In particular, it is directed to an autonomous vehicle relying on heterogeneous redundancy checks; distinct perceptions are formed from signals obtained from overlapping sets of sensors, whereby one of the perceptions is used to validate trajectories obtained from the other.

BACKGROUND

Self-driving vehicles (also known as autonomous vehicles or driverless vehicles) are vehicles that are capable of traveling with little, or even without, human inputs. Such vehicles use sensors (e.g., lidars, cameras, radars, sonars, GPS, and inertial measurement units) to perceive their surroundings. Sensory information is used to create a model of the vehicle's surroundings and the model is used to generate a navigation path.

Motion prediction is a necessary part of any autonomous driving application that employs predictive planning techniques. Often, redundant motion planners are run in parallel on separate computer systems to ensure that automated driving functions operate safely and reliably. However, redundancy multiplies the number of operations needed to process sensory information obtained from the sensors. Moreover, existing redundant systems are not infallible. For example, faulty sensors or faulty sensing schemes would normally result in the same planned motions, notwithstanding redundancy. Thus, there is a need to improve current redundancy schemes, both in terms of required computing power and performance.

SUMMARY

According to a first aspect, the present invention is embodied as an autonomous vehicle, e.g., an autonomous or semi-autonomous vehicle such as a self-driving car. The autonomous vehicle comprises a drive-by-wire (DbW) system, a set of perception sensors (e.g., including lidars, cameras, as well as radars, sonars, GPS, and inertial measurement units), and two processing systems, i.e., a first processing system and a second processing system. The first processing system is configured to form a main perception based on signals from each of the perception sensors of the set, estimate states of the vehicle based on feedback signals from the DbW system, and compute trajectories for the autonomous vehicle based on the perception formed and the estimated states. The second processing system is configured to form an auxiliary perception based on signals from only a subset of the perception sensors, validate the computed trajectories based on the auxiliary perception formed, and cause to forward the validated trajectories to the DbW system.

That is, all the sensors of the set are used to form the main perception. However, instead of re-using all of the perception sensors to form a full redundancy, only a subset of the sensors are used to form the auxiliary perception that is then used to validate the trajectories. In other words, distinct perceptions are formed from overlapping sets of sensors, whereby one of the perceptions formed is used to validate trajectories obtained from the other. This approach requires less computational efforts, inasmuch as less signals (and therefore less information) are required to form the auxiliary perception. Still, this approach is more likely to allow inconsistencies to be detected, thanks to the heterogeneity of sensor signals used to obtain the main and auxiliary perceptions.

In embodiments, the second processing system is further configured to: form said auxiliary perception as a global representation, which includes a world representation (i.e., a representation of the surroundings of the vehicle) and embeds a representation of the autonomous vehicle; validate, at each time point of a sequence of time points, the estimated states based on the auxiliary perception as formed at one or more previous one of the time points, whereby the computed trajectories are further validated based on the validated states, in operation; and update, at said each time point, both the world representation, thanks to said signals from the subset of sensors, and the representation of the autonomous vehicle, thanks to states of the vehicle as previously validated at one or more previous ones of the time points. This way, a self-consistent solution is achieved, timewise, in which the auxiliary perception is used to validate states as computed by the first processing system, whereas the validated states are subsequently used to update the vehicle representation in the auxiliary perception.

Preferably, the first processing system includes a main perception unit, a state estimation unit, and a motion planning unit. The main perception unit is connected to each of the sensors and is configured to form the main perception. The state estimation unit, to which the DbW system is connected, is configured to estimate the states of the vehicle. The motion planning unit is configured to compute said trajectories. The second processing system includes an auxiliary perception unit and a validation unit. The auxiliary perception unit is configured to form said auxiliary perception, while the validation unit is configured to validate the computed trajectories and cause to forward the validated trajectories to the DbW system. Such an architecture makes it possible to safely implement the self-consistent solution discussed above, inasmuch as each essential function is mapped to a respective unit, which unit can incidentally be mapped onto a respective processing means.

In that respect, the autonomous vehicle may further comprise sets of processors, each of the sets comprising one or more processors. Now, the main perception unit, the state estimation unit, the motion planning unit, the auxiliary perception unit, and the validation unit, can advantageously be mapped onto respective ones of the sets of processors. Even, the first processing system and the second processing system are preferably implemented as distinct computers of the autonomous vehicle. The exact mapping, however, may depend on the security levels offered by the (sets of) processors.

In preferred embodiments, the validation unit is configured to validate the computed trajectories by verifying that such trajectories are collision-free, based on said world representation, under the condition that the estimated states are validated. That is, the validation of the vehicle states acts as a software interrupt, whereby the trajectories can be recurrently and continually verified, until (i.e., unless) the vehicle states happen to be invalidated by the second processing system.

In embodiments, the auxiliary perception unit is configured to run an occupancy grid map generator and a vehicle pose checker. The occupancy grid map generator is designed to generate occupancy grids for successive ones of the time points based on signals obtained from said subset of perception sensors. Such occupancy grids are preferably updated at a frequency that is between 6 Hz and 18 Hz, e.g., at a frequency that is equal, or approximately equal, to 10 Hz. The occupancy grids capture the global representation. The vehicle pose checker is designed to validate the estimated states of the vehicle by comparing a first pose of the vehicle corresponding to the estimated states with a second pose of the vehicle as captured in said occupancy grids by the representation of the autonomous vehicle. Occupancy grids efficiently capture the world representation, especially when generated as 2D grids, as in preferred embodiments), which makes it possible to easily check for potential collisions. In addition, the embedded representation of the vehicle and the above update mechanism allow the vehicle states to be simply validated based on previously validated states.

Preferably, the vehicle pose checker is designed to validate the estimated states of the vehicle by comparing first speeds of the vehicle as captured by the estimated states with second speeds of the vehicle as captured in said occupancy grids by at least two successive representations of the autonomous vehicle at two or more successive ones of the time points. I.e., speeds can be taken into account, too, beyond the sole vehicle poses, to verify the vehicle states more exhaustively. Other quantities may similarly be considered, such as accelerations and angular speeds.

In preferred embodiments, the occupancy grid map generator is designed to update, at said each time point, a current grid of the occupancy grids based on the first pose as validated by the vehicle pose checker at one or more previous ones of the time points, preferably at one or more immediately preceding ones of the time points, so as to update the representation of the autonomous vehicle in the current grid. I.e., occupancy grids provide an efficient way to self-consistently updates the vehicle representation in the auxiliary perception.

In addition, occupancy grids make it easy to verify that trajectories are collision-free, while the verification of the states can again act as a software interrupt. I.e., in preferred embodiments, the validation unit is configured to validate the computed trajectories by verifying that such trajectories are collision-free according to said occupancy grids, provided that the poses, and optionally speeds, of the vehicle, are validated by the vehicle pose checker.

In embodiments, the set of perception sensors include one or more lidars and one or more cameras, while said subset of perception sensors include the one or more lidars but does not include any of the one or more cameras. I.e., the sensor signals considered in each pipeline are obtained from heterogeneous types of sensors.

For example, use can be made of a plurality of lidars. In that case, the occupancy grid map generator may be designed to obtain each occupancy grid of said occupancy grids by independently obtaining concurrent occupancy grids based on signals obtained from distinct ones of the lidars and then merging the concurrent occupancy grids obtained into said each occupancy grid. This improves the signal-to-noise ratios of the grids obtained from the various lidars. Note, the occupancy grid map generator may advantageously be configured to obtain the concurrent occupancy grids in polar coordinates and then merge the concurrent occupancy grids obtained into a single occupancy grid, which is defined in cartesian coordinates. Polar coordinates lend themselves well to lidar detections, while the merged grid is better defined in cartesian coordinates as cartesian coordinates are eventually easier to work with, especially when dealing with maps and GPS signals.

Preferably, each occupancy grid comprises cells that can have different cell states, the latter including an occupied state and a free state, and optionally an unknow state. In that case, the occupancy grid map generator can be further designed to update cell states of cells of the occupancy grids based on time-redundant information obtained for the cells, whereby a change to any cell state is taken into account by the occupancy grid map generator only if information characterizing this change is observed twice in a row for two successive ones of said time points. Using time-redundant information mitigates the risk of accidental state changes and results in more consistent (also more accurate) grids.

As said, the cell states may further include an unknown state, in addition to said occupied state and said free state. Unknown cell states typically correspond to occluded regions of the surroundings of the vehicle, which the sensors cannot see or otherwise detect. In that regard, the occupancy grid map generator may advantageously be designed to implement a reset mechanism, for security reasons. This mechanism resets the state of any cell, for which no information can be obtained for a given time period or a given number of successive grids, to the unknown state. The validation heuristics may be adapted, based on this additional state, which eventually allows the validation unit to make better-informed decisions.

In preferred embodiments, the second processing system further comprises a misalignment detection unit, which is operatively connected to each of the one or more lidars to detect a potential misalignment thereof and cause each of the first processing system and the second processing system to discard signals obtained from any lidar for which a misalignment is detected. Moreover, the second processing system may further be configured to implement a lidar diagnosis unit, the latter designed to detect sensory errors of any of the one or more lidars. The misalignment detection unit and the lidar diagnosis unit contribute to reinforcing the level of security of the lidars. In turn, the validation unit can be more easily certified, such that the first processing system (in particular the motion planning unit) Just need to be quality managed.

According to another aspect, the invention is embodied as a method of driving an autonomous vehicle such as defined above. I.e., the autonomous vehicle comprises a DbW system, a set of perception sensors, and two processing systems, i.e., a first processing system and a second processing system. Consistently with the present autonomous vehicles, the method comprises, at the first processing system, forming a main perception based on signals from each of the perception sensors, estimating states of the vehicle based on feedback signals from the DbW system, and computing trajectories for the autonomous vehicle based on the formed perception and the estimated states. And the method further comprises, at the second processing system, forming an auxiliary perception based on signals from only a subset of the perception sensors, validating the computed trajectories based on the auxiliary perception formed, and causing to forward the validated trajectories to the DbW system.

According to a final aspect, the invention is embodied as a computer program product for driving an autonomous vehicle comprising a DbW system, a set of perception sensors, and two processing systems. The computer program product comprises a computer readable storage medium having program instructions embodied therewith. Such program instructions are executable by processing means of the two processing systems, to cause such systems to perform steps according to the above method.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description.

In the drawings.

Figure 1:
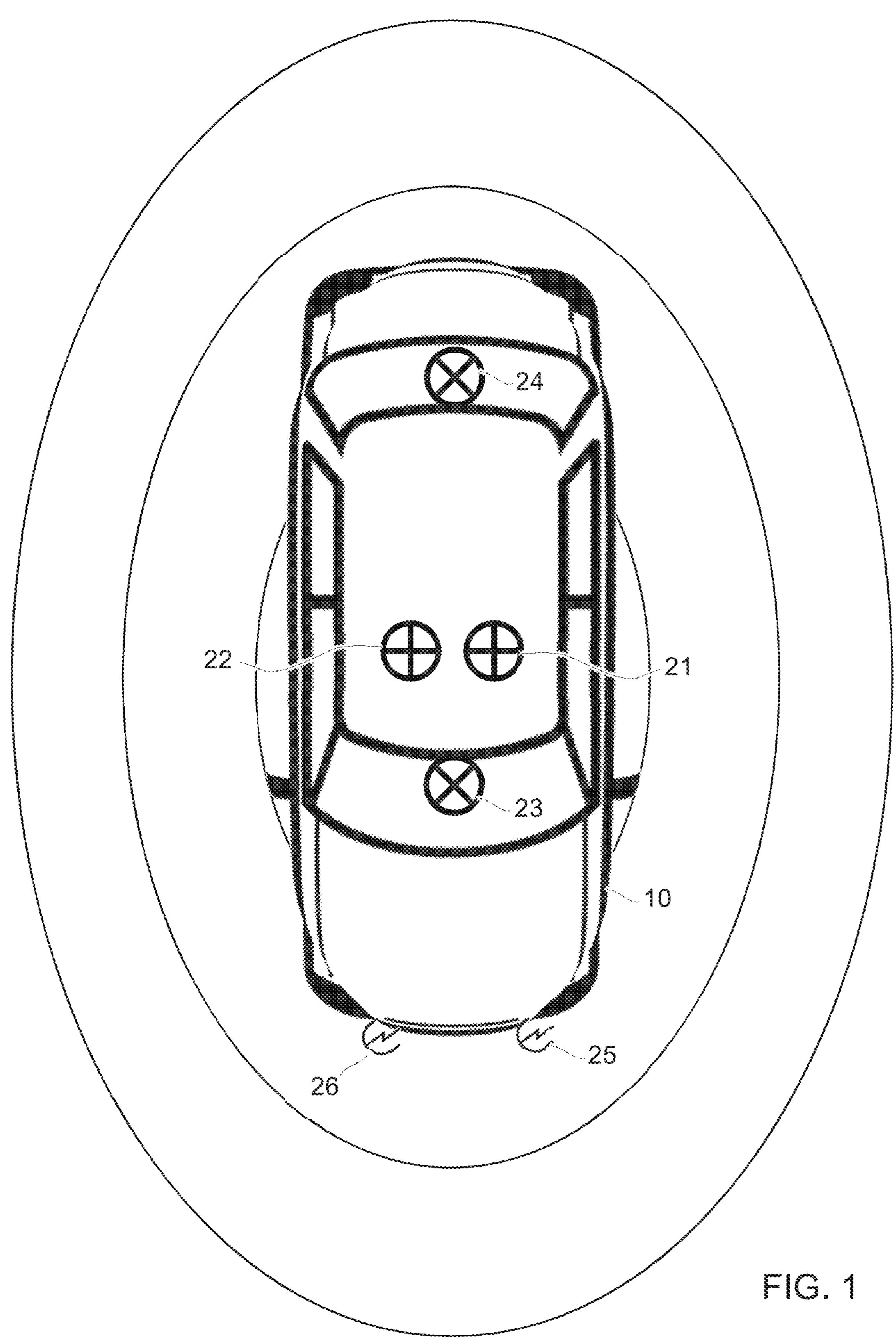
FIG. 1 is a top view of an autonomous car comprising a set of perception sensors (lidars, cameras, and radars) to sense the surroundings of the car, as in embodiments.

The accompanying drawings show simplified representations of systems, devices, or parts thereof, and other concepts, as involved in embodiments. In particular, the grids depicted in FIGS. 5B and 5C are purposely coarse, for the sake of depiction. In practical embodiments, such grids embed only one vehicle representation at a time; each grid only embeds the current vehicle pose. Note, features depicted in the drawings are not necessarily to scale. Similar or functionally similar elements in the figures have been allocated the same numeral references, unless otherwise indicated.

Autonomous vehicles, computer-implemented methods, and computer program products embodying the present invention will now be described, by way of non-limiting examples.

DETAILED DESCRIPTION OF EMBODIMENTS OF THE INVENTION

The following description is structured as follows. General embodiments and high-level variants are described in section 1. Section 2 addresses particularly preferred embodiments. Section 3 concerns technical implementation details. All references Sn refer to methods steps of the flowchart of FIG. 3, while numeral and letter references pertain to devices, components, and other concepts, as involved in embodiments of the present invention.

1. General Embodiments and High-Level Variants

Figure 2:
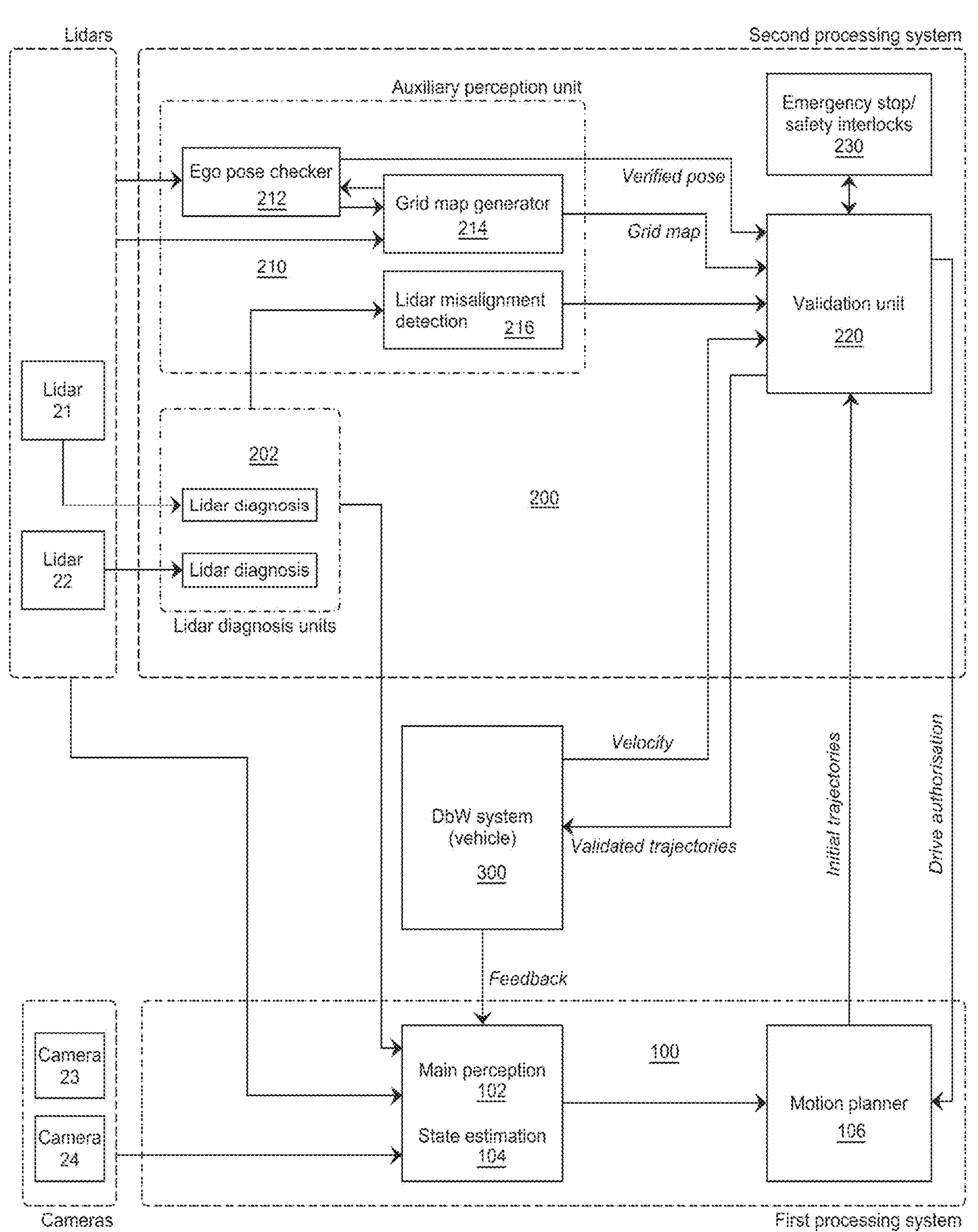
FIG. 2 is a diagram of the processing system architecture of an autonomous car according to embodiments.
Figure 3:
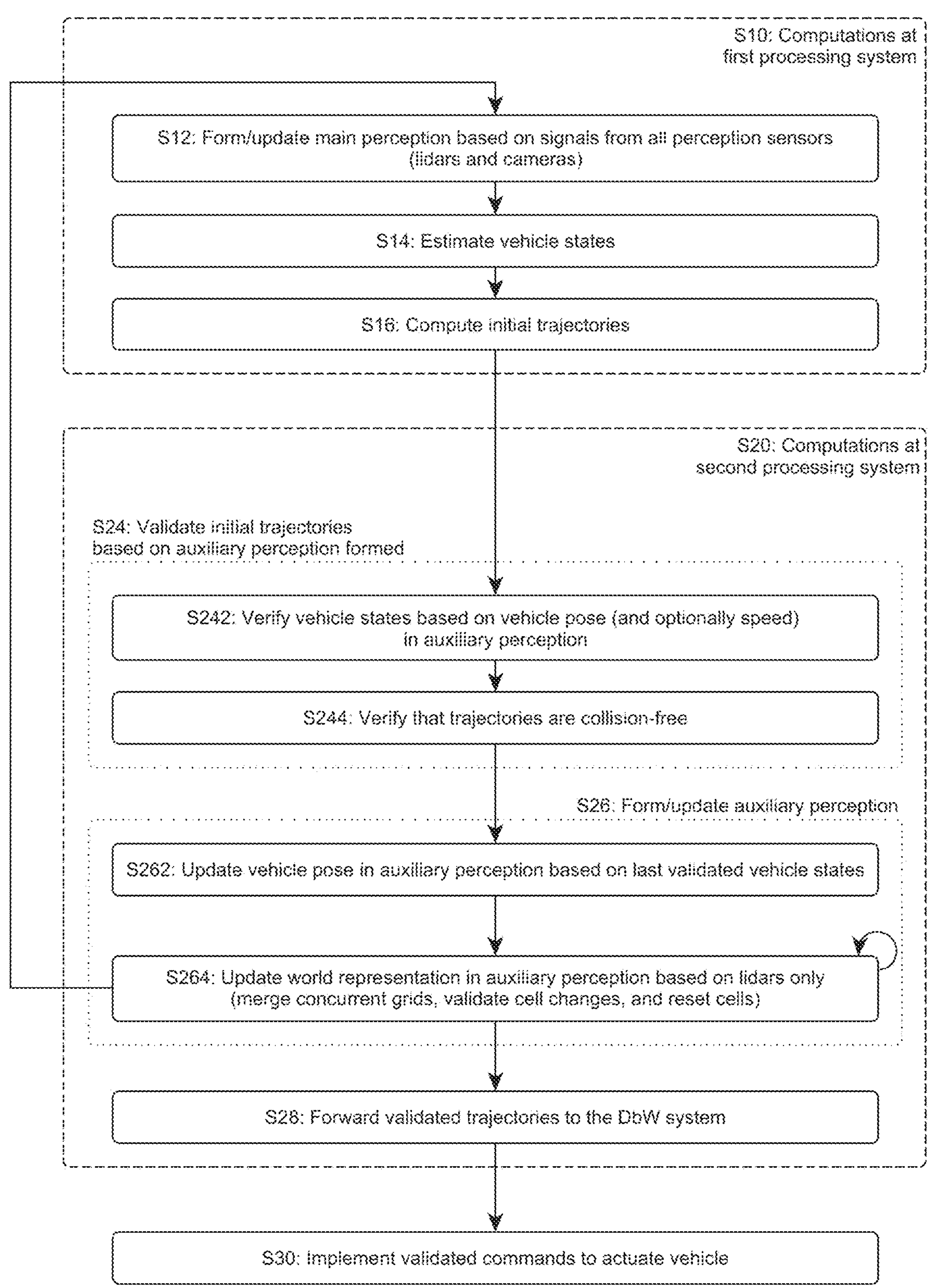
FIG. 3 is a flowchart illustrating high-level steps of a method of driving this autonomous car, according to embodiments.

A first aspect of the invention is now described in detail in reference to FIGS. 1-3. This aspect concerns an autonomous vehicle 10, which is at least partly automated and has sensing capability.

Note, the terminologies "autonomous" and "automated" are sometimes used as synonyms. In general, "autonomous", "semi-autonomous", and "partly autonomous", refer to concepts that involve some self-governance of machines, whereby such machines are capable of sensing their environment to safely move therein, avoiding obstacles and collisions with other objects, whether static or in motion. In this document, the terminology "autonomous" is to be understood in a broad sense. I.e., an autonomous vehicle is a device that has sensing capability and is at least partly automated, so as to be at least partly autonomous, though not necessarily fully autonomous. That is, the vehicle incorporates automation to move (e.g., drive), whereby it can automatically drive from one location to another, by sensing its environment, such that it is aware of its location and surroundings.

The vehicle can have various levels of autonomy. At the very least, the automated system of the vehicle (see FIG. 2 for an example) is capable of taking control of the vehicle for the latter to start, accelerate, brake, steer, and stop, so as to be able to move from one location to another. The autonomous vehicle 10 is a ground vehicle, typically an autonomous car. In principle, such vehicles can be of any type, e.g., cars, vans, transit buses, motorcoaches, trucks, lorries, or any other types of ground vehicles that may benefit from automation. In typical embodiments, though, the present autonomous vehicles are production cars, vans, electric vehicles, or the likes, which benefit from automatic driving and are at least level 2 (hands off), possibly level 3 (eyes off), level 4 (mind off), or level 5 (steering wheel optional), according to the system developed by SAE International (formerly named the Society of Automotive Engineers).

As seen in FIGS. 1 and 2, the vehicle 10 comprises a drive-by-wire (DbW) system 300, a set of perception sensors 21-26 (e.g., lidars, lidars, cameras, radars, sonars, GPS, and inertial measurement units), as well as two processing systems 100, 200. The processing systems include a first processing system 100 and a second processing system 100. The two systems are preferably implemented as two separate computers, as assumed in FIG. 2. Each module or unit of each system preferably executes on a dedicated processor or set of processors (e.g., a CPU). Whether to use distinct computers or not depends on the security level achieved by the processors. In all cases, the two processing systems 100, 200 implement distinct pipelines, although the two pipelines use signals obtained from overlapping sets of sensors, as further discussed below.

As illustrated in the flow of FIG. 3, the first processing system 100 is configured to form (step S12 in FIG. 3) a main perception, estimate (step S14) states of the vehicle 10, and compute S16 trajectories for the autonomous vehicle 10. The main perception is formed S12 based on signals obtained from each of the perception sensors 21-26. That is, each sensor of that set is used to produce the main perception. The states of the vehicle 10 are estimated S14 based on feedback signals from the DbW system 300, which is aware of the current state parameters (e.g., current speed, acceleration, braking, steering). The trajectories for the autonomous vehicle 10 are then computed S16 based on the perception formed and the estimated states. Practically speaking, a trajectory can be defined as series of commands for respective actuators (acceleration, steering, and braking) and for successive time points. That is, such commands embody a trajectory, which is determined in accordance with a goal set in space, or preferably in both space and time.

The second processing system 200 allows heterogeneous redundancy to be achieved. To that aim, the system 200 is configured to form S26 an auxiliary perception and accordingly validate S24 the trajectories as initially computed by the first processing system. In more details, the auxiliary perception is formed S26 based on signals obtained from only a subset of sensors 21, 22 of the set of perception sensors used to form the main perception. In turn, the initial trajectories (i.e., as computed by the first processing system) are validated S24 by the second processing system based on the auxiliary perception formed. Eventually, the second processing system 200 causes to forward S28 the validated trajectories to the DbW system 300, with a view to implementing S30 the corresponding commands and thus actuating the vehicle 10. An auxiliary procedure (e.g., an emergency procedure) may be triggered in the unlikely event that that an initial trajectory happens to be invalidated by the second processing system 200 (not shown in FIG. 3).

Comments are in order. Perception refers to both the action and the outcome of assigning semantics to the sensory data captured by signals obtained from the perception sensors. As usual, the perception sensors may include lidars 21, 22, and cameras 23, 24, and radars 25, 26.

In addition, the sensors may include a GPS, sonars (i.e., ultrasound sensors), and inertial measurement units (not shown in FIG. 1). In preferred embodiments as discussed below, the set of perception sensors at least include lidars 21, 22 and cameras 23, 24.

All the sensors of the set are used to implement the main perception, while the redundancy checks performed by the second processing system 200 are based on signals obtained from only a subset of the perception sensors 21, 22. I.e., instead of re-using all of the perception sensors to form a full redundancy (as in prior solutions), distinct perceptions are formed from overlapping sets of sensors, whereby one of the perceptions formed is used to validate trajectories obtained from the other. This requires less computational efforts, inasmuch as less signals (and therefore less information) are required to form the auxiliary perception. Still, the proposed approach is more likely to allow inconsistencies to be detected, thanks to the heterogeneity of sensor signals considered in input to the main and auxiliary perceptions.

Figure 4:
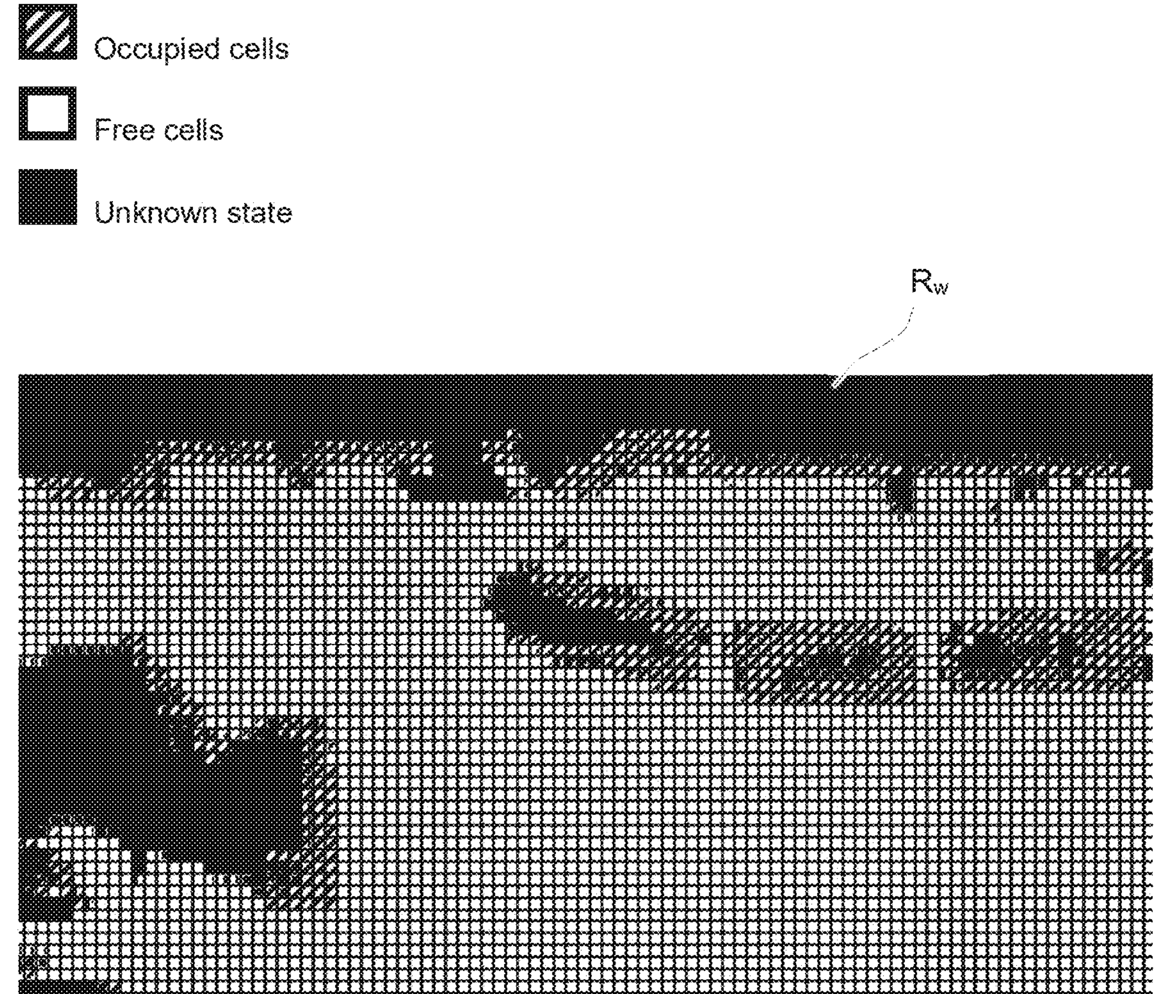
FIG. 4 shows a 2D occupancy grid generated by an occupancy grid map generator at a given time point, as involved in embodiments. In this example, the grid shows a representation of the surroundings of an autonomous car; it does not embed a representation of this car yet, SEE FIGS. 5B and 5C.

Referring now to FIGS. 4, 5B, and 5C, the second processing system 200 is preferably configured to form S26 the auxiliary perception as a global representation, which includes a world representation $R_w$ and further embed a representation 10*r* of the autonomous vehicle 10. The world representation $R_w$ is a representation of the surroundings of the vehicle 10. This representation allows the second processing system 200 to check whether the initial trajectories are collision-free, something that can fairly easily be achieved using cones projected from each current vehicle position, as explained in detail in Section 2, in reference to FIGS. 5B and 5C. The representation 10*r* of the autonomous vehicle 10 is appropriately positioned in the world representation $R_w$, as illustrated in FIGS. 5B and 5C for successive time steps.

Interestingly, the embedded representation 10*r* of the vehicle 10 makes it possible to validate S242 the initial states of the vehicle, as estimated by the first processing system 100. In principle, the representation 10*r* of the vehicle may be adequately positioned thanks to, e.g., feedback signals from the DbW system and/or GPS signals. However, a better strategy is to leverage states of the vehicle as previously validated, given the frequency at which the auxiliary perception is updated, as explained below in detail.

Consider a sequence of time points, whereby the initial states are to be validated by the second processing system 200 at each time point of this sequence. The initial states of the vehicle, as estimated by the first processing system 100, can be validated S242 at each time point of this sequence based on the auxiliary perception as formed at a previous time point, e.g., the immediately preceding time point. Note, the auxiliary perception corresponding to a single time point is needed to verify the pose of the vehicle, while perceptions corresponding to two or more successive time points can be used to additionally verify the speed of the vehicle. Similarly, at least three time points can be used to verify the acceleration. This way, the trajectories as computed by the first processing system 100 can be validated based on previously validated states of the vehicle.

The auxiliary perception must be consistently updated S262, at each time point. That is, the representation 10*r* of the autonomous vehicle 10 is updated S262 thanks to states of the vehicle 10 as previously validated at one or more previous time points of the sequence. For completeness, the world representation $R_w$ is regularly updated too, thanks to signals obtained from the sole subset of sensors 21, 22. This way, a self-consistent solution is achieved, timewise, in which the auxiliary perception formed is used to validate the states as computed by the first processing system 100, while the validated states are subsequently used to update the vehicle 10 representation 10*r* in the auxiliary perception. In practice, the time lag between successive auxiliary perceptions is not an issue, given the typical frequencies at which the auxiliary perception is updated, as discussed later.

In terms of architecture, see FIG. 2, the first processing system 100 typically includes a main perception unit 102, a state estimation unit 104, and a motion planner 106 (i.e., a motion planning unit). The main perception unit 102 is connected to each of the sensors 21-26 and is configured to form S12 the main perception. The main perception unit 102 typically produces a list of objects based on signals provided by the full set of perception sensors 21-26, in operation. The DbW system 300 is connected to the state estimation unit 104, such that the state estimation unit 104 can estimate states of the vehicle 10 based on feedback signals from the DbW system 300. Additional signals, such as GPS signals, may be used, too. The motion planning unit 106 is configured to compute S16 the initial trajectories. The motion planning unit 106 is connected by each of the main perception unit 102 and the state estimation unit 104 and determines the vehicle trajectories by exploiting information produced by the two units 102, 104.

A further seen in FIG. 2, the second processing system 200 preferably includes an auxiliary perception unit 210 and a validation unit 220. The auxiliary perception unit 210 is configured to form S26 the auxiliary perception, while the validation unit 220 is configured to validate S24 the initial trajectories. Eventually, the validation unit 220 forwards, or otherwise causes to forward, the validated trajectories to the DbW system 300. As said, trajectories are typically determined in the form of commands containing instructions with respective execution times. Such commands are designed to be executed by respective electromechanical actuators of the DbW system 300 to cause the vehicle to follow a drivable trajectory, e.g., in accordance with a goal set in space and time.

The above architecture makes it possible to safely implement the self-consistent solution discussed above, inasmuch as each essential function is mapped to a respective unit, which can itself be mapped onto a respective processing means. For example, the autonomous vehicle 10 may comprises sets of processors (each set includes one or more processors), whereby the main perception unit 102, the state estimation unit 104, the motion planning unit 106, the auxiliary perception unit 210, and the validation unit 220, can be mapped onto respective sets of processors. As noted earlier, the first processing system 100 and the second processing system 200 may possibly be implemented as distinct computers of the autonomous vehicle 10. Whether to do so depends on the performance and the security level that can be achieved by each of the sets of processors. In variants, a single computer may be contemplated, provided that its sets of processors are sufficiently safe. An example of suitable functional safety standard is defined by the ISO26262 standard for the development of electrical and electronic systems in road vehicles.

As noted earlier, the world representation $R_w$ can be leveraged by the second processing system to verify S244 that the computed trajectories are collision-free. In addition, the validation can be based on validated states, as explained above. A simple strategy is to verify S244 that the computed trajectories are collision-free, as long as the estimated states keep on being validated S242. That is, the validation of the vehicle states may act as a software interrupt, whereby the validations performed at step S244 are recurrently and continually performed, hence leading to recurrent validations of the initial trajectories, unless the vehicle states happen to be invalidated at some point. In other words, the validation unit 220 validates S24 the computed trajectories by verifying S244 that the computed trajectories are collision-free, based on the world representation $R_w$, but under the condition that the estimated states are validated S242, as assumed in FIG. 3. Note, FIG. 3 assumes a correct validation at each of steps S242 and S244. Fallback procedures (e.g., an emergency stop) would be triggered, should any verification S242, S244 fail (not shown in FIG. 2).

The following describes the auxiliary perception in more details. The auxiliary perception unit 210 is preferably configured to run an occupancy grid map generator 214. The latter is designed to generate S264 occupancy grids for successive time points, by exploiting signals obtained from the subset of perception sensors 21, 22 only. An example of occupancy grid is shown in FIG. 4. In this example, the grid is a 2D grid, which reflects the world representation $R_w$, i.e., the surroundings of the vehicle. Note, the representation of the vehicle 10 (ego vehicle) was not incorporated yet. Preferably, though, each occupancy grid captures a global representation, which embeds the representation 10*r* of the vehicle in the world representation $R_w$, as illustrated in FIGS. 5B and 5C.

As further seen in FIG. 2, the auxiliary perception unit 210 may include a vehicle pose checker 212 (or ego pose checker). The vehicle pose checker 212 is designed to validate S242 the states of the vehicle 10 (as initially estimated by the first processing system). Assuming that a representation 10*r* of the vehicle 10 is embedded in the world representation $R_w$, the vehicle pose checker 212 can validate S242 the states of the vehicle 10 by comparing the pose of the vehicle corresponding to the estimated states with the reference pose as captured in one or more occupancy grids by the embedded representation 10*r* of the autonomous vehicle 10. Thus, the world representation $R_w$ makes it possible to easily check for potential collisions, while the embedded representations 10*r* of the vehicle 10 allow the vehicle states to be simply validated, thanks to the update mechanism based on previously validated states.

Note, beyond the vehicle pose, speeds and accelerations may be similarly verified, if necessary. That is, the vehicle pose checker 212 may be designed to validate S242 the estimated states of the vehicle 10 by additionally comparing speeds of the vehicle as captured by the initial states (as initially estimated by the first processing system) with speeds as captured in successive occupancy grids. At least two successive representations of the autonomous vehicle 10, corresponding to at least two successive time points, are required to verify the current speed. I.e., speeds can be obtained from successive vehicle poses in successive grids, considering the time intervals between two successive grids. The acceleration can be similarly verified, based on at least three successive grids. Note, the successive grids considered would likely be consecutive grids. Moreover, dynamic rotations (angular speeds) of the vehicle 10 may be similarly verified. Each quantity of interest (pose, speed, acceleration, angular speed) can be validated by verifying that it is consistent with the quantity captured in the previous grids, i.e., grids corresponding to previous time points. Any suitable metric can be contemplated. In practice, a threshold distance can be used, whereby newly estimated states of the vehicles are validated unless they depart by more than a predetermined threshold distance from the states as captured in the current grid. For example, a newly computed pose should remain close to the reference pose captured in the current grid (it being reminded that the reference pose has been obtained based on previously validated states), and not deviate by more than a predefined threshold. Adequate thresholds can be adjusted through trial and error.

As per the proposed approach, previously validated quantities can be used to update the grids. In practice, though, it is sufficient to rely on a previously validated vehicle pose. I.e., the occupancy grid map generator 214 may be designed to update S262 the current occupancy grid (at each time point) based on the vehicle pose as validated S242 by the vehicle pose checker 212 at a previous time point, e.g., the immediately preceding time point. If necessary, more sophisticated schemes (e.g., based on extrapolation) can be contemplated, where poses as validated at two or more previous times points are used to update S262 the representation 10*r* of the autonomous vehicle 10 in the current grid.

In other words, self-consistency is achieved by verifying that vehicle states as computed by the primary state estimation unit 104 are consistent with the vehicle pose (and possibly other quantities like speed, acceleration, angular speed) as captured in previous occupancy grids, while the validated states are used to update the grids. The time difference between two successive grids is not an issue, given the typical frequencies at which the grids are updated. Typically, the occupancy grids are updated at a frequency that is between 6 Hz and 18 Hz, for example equal to 10 Hz. And as noted earlier too, an efficient strategy is to continually validate the initial trajectories (by verifying that such trajectories are collision-free according to the occupancy grids), as long as the poses (and optionally the speeds, etc.) of the vehicle 10 are not invalidated by the vehicle pose checker 212.

The following describes preferred sets and subsets of sensors. In preferred embodiments, the set of perception sensors 21-26 include at least two heterogeneous types of sensors, such as one or more lidars 21, 22 and one or more cameras 23, 24. Now, the subset of sensors used to form the auxiliary perception may restrict to one type of sensors, e.g., the lidars. That is, in preferred embodiments, the subset of perception sensors 21, 22 used to form the auxiliary perception includes the one or more lidars 21, 22 but does not include any of the one or more cameras 23, 24. In other words, at least two different types of sensors (i.e., lidars and cameras) are used to compute the trajectories (first processing system 100), while at least one of the types of sensors (e.g., the cameras) are discarded to form the auxiliary perception and perform the redundancy checks. That is, the sensors considered allow a heterogeneous redundancy with respect to the types of sensors used in each pipeline.

In preferred embodiments, both processing systems 100, 200 rely on a plurality of lidars 21, 22. In that case, the occupancy grid map generator 214 may advantageously be designed to first obtain concurrent occupancy grids from each lidar and then merge concurrent grids to form a reliable grid for each current time point. That is, each occupancy grid is obtained S264 by independently obtaining concurrent occupancy grids based on signals obtained from distinct lidars 21, 22 and then merging the concurrent occupancy grids obtained into one grid, to improves the signal-to-noise ratios of the grids obtained from the various lidars 21, 22; the concurrent grids are typically noisy, in practice. Note, the concurrent occupancy grids are advantageously obtained in polar coordinates, which lend themselves well to lidar detections, while the merged grid is better defined in cartesian coordinates. Cartesian coordinates are eventually easier to work with, especially when dealing with maps and GPS signals.

As seen in FIGS. 4, 5B, and 5C, an occupancy grid may eventually be defined as an array of cells, which can be assigned different states. At the very least, a cell should be defined as being occupied or free. The cell states can be updated at each cycle. However, a judicious strategy is to update the cell states based on time-redundant information, to avoid accidental changes. That is, the occupancy grid map generator 214 may be designed to update S264 the states of cells of the occupancy grids based on time-redundant information obtained for the cells, such that a change to any cell state will only be taken into account by the occupancy grid map generator 214 if information as to this change is observed at least twice in a row, i.e., for at least two successive time points. In other words, events materializing a cell state change must be observed at least twice in a row before being validated and incorporated in a grid. Doing so is all the more welcome that concurrent grids (as obtained from distinct lidars) may disagree, something that could generate inadvertent cell state changes. Eventually, using time-redundant information results in more consistent and, thus, more accurate grids.

Sometimes, the actual cell states may be unknown, e.g., because no information is available, due to occlusion. Such cells may, by default, be assumed to be occupied, for security reasons. Alternatively, a further cell state may be considered, which corresponds to an unknown, or undetermined state, in addition to the free and occupied cell states, as assumed in FIGS. 4, 5B, and 5C. As the vehicle moves, specific areas of its surrounding may become occluded, meaning that the sensors may become unable to correctly detect such areas. In this regard, the occupancy grid map generator 214 may advantageously be configured to implement S264 a reset mechanism to reset the cells to the unknown state, should the sensors lose track of the actual status of such cells. This mechanism automatically resets the state of any cell, for which no information can be obtained for a given time period or a given number of successive grids. The validation heuristics may be accordingly adapted, taking into account the additional unknown state, which eventually makes it possible for the second processing system to make better-informed decisions. That is, a decision made in respect to a cell known to be occupied or free may differ from a decision made in respect of a cell whose state is unknown.

According to the proposed architecture, the validation unit 220 is a downstream component, which is used to validate trajectories from the motion planning unit. Note, the validation unit 220 may similarly be used downstream of several motion planners, e.g., redundant motion planners, whereby the validation unit may be used to validate multiple trajectories, so as to only send validated commands to the vehicle's actuators. Interestingly, this architecture allows the validation unit to be fairly easily certified, hence removing the hard requirement of certifying the complex motion planning, which will then only need to be quality managed (QM). Consistently with the two pipelines shown in FIG. 2, quality management may logically extend to the set of cameras, while the lidars and DbW system may have to be certified, too.

To this aim, the second processing system 200 may further comprise a misalignment detection unit 216, which is operatively connected to each of the lidars 21, 22, so as to be able to detect a potential misalignment thereof, see FIG. 2. In that case, the misalignment detection unit 216 would inform the downstream components to switch off signals arising from misaligned lidars, to make sure that the first and second processing systems 100, 200 discard signals transmitted from any misaligned lidar. For example, the lidar misalignment detection unit 216 may inform the validation unit 220 that a lidar is, e.g., moved or tilted by more than a predefined threshold. In that case, data from the misaligned lidar unit will be ignored or shut down by the system. This will likely result in more unknown areas in the grid maps. The misalignment detection may for instance be based on a reference point cloud measurement.

Moreover, the second processing system 200 may further be configured to implement a lidar diagnosis unit 202, as also assumed in FIG. 2. The unit 202 is designed to detect sensory errors of any of the lidars 21, 22. This unit 202 is typically implemented in software running concurrently to all other processes. Each diagnosis module shown in the unit 202 works on a respective lidar. The unit 202 connects to the unit 216. This additional software can be used to qualify non-certified lidars as part of the path concerned with Safety Integrity Level (SIL) or Automotive Safety Integrity Level (ASIL), i.e., the path leading from the lidars to the validation unit (in the second processing system) and then to the DbW system 300. This software ensures that all relevant sensor errors of the lidars 21, 22 are detected. E.g., if one Lidar self-diagnoses as faulty, then it sends a signal de-authorizing the drive. Further checks may be implemented to verify that each lidar is still aligned.

Referring more particularly to FIG. 3, another aspect of the invention is now described, which concerns a method of driving an autonomous vehicle 10. Features of the method have already been implicitly described in reference to the present vehicles 10. Accordingly, such features are only briefly described in the following. As said, the autonomous vehicle 10 comprises a DbW system 300, a set of perception sensors 21-26, and two processing systems 100, 200, i.e., a first processing system 100 and a second processing system 200. The method comprises, at the first processing system 100, forming (step S12) a main perception based on signals from each of the perception sensors 21-26 (including both the lidars and the cameras), estimating (step S14) states of the vehicle 10 based on feedback signals from the DbW system 300, and then computing (step S16) trajectories for the autonomous vehicle 10 based on the formed perception and the estimated states. At the second processing system 200, the method further comprises forming S26 an auxiliary perception based on signals from only a subset of the perception sensors (e.g., the lidars 21, 22 only), validating S24 the computed trajectories based on the auxiliary perception formed, and causing to forward S28 the validated trajectories to the DbW system 300 for actuation purposes S30.

Closely related, a final aspect of the invention concerns a computer program product for driving an autonomous vehicle 10 as described above. The computer program product comprises a computer readable storage medium, having program instructions embodied therewith. The program instructions are executable by processing means of the two processing systems 100, 200 of the vehicle 10. The execution of the program instructions causes the processing systems 100, 200 to perform steps as described above. Additional details are provided in Sections 2.2 and 3.

The above embodiments have been succinctly described in reference to the accompanying drawings and may accommodate a number of variants. Several combinations of the above features may be contemplated. Examples are given in the next section.

2. Specific Embodiments

2.1 Preferred System Architecture

FIG. 2 illustrates a preferred system architecture, which involves a first processing system 100 and a second processing system 100, a DbW system 300, as well as two sets of sensors, corresponding to lidars 21, 22 and cameras 23, 24. The two sets of sensors connect to the first processing system 100, while only the lidars 21, 22 connect to the second processing system 200. The two processing systems are implemented as distinct computers. Their main functions are implemented at distinct CPUs.

The first processing system 100 is configured to run a main perception unit 102, a state estimation unit 104, and a motion planner unit 106. As explained in detail in Section 1, these units 102-106 are used to form a main perception based on signals obtained from each of the perception sensors 21-24, estimate states of the vehicle 10 based on feedback signals from the DbW system 300, and compute trajectories for the automated vehicle 10 based on the perception formed and the estimated states.

The second processing system 200 is configured to run an auxiliary perception unit 210, which includes a vehicle (ego) pose checker 212 and a grid map generator 214, and a validation unit 220. As explained in Section 1, the auxiliary perception unit 210 is configured to form an auxiliary perception based on signals from the second subset of perception sensors (i.e., the lidars 21, 22 in the example of FIG. 2), while the validation unit 220 is used to validate the computed trajectories using the auxiliary perception formed, in operation.

In detail, the occupancy grid map generator 214 is designed to generate occupancy grids for successive time points based on signals obtained from the lidars 21, 22; the occupancy grids capture a global representation, which includes a world representation (i.e., the surroundings of the ego vehicle 10) and embeds a representation 10*r* of the vehicle 10. The vehicle pose checker 212 is designed to validate the estimated states of the vehicle 10 by comparing the pose of the vehicle that corresponds to the estimated states with the pose as captured in the occupancy grids by the embedded representation of the automated vehicle. The occupancy grid map generator 214 updates each current occupancy grid, at each time point, based on the last pose validated by the vehicle pose checker 212.

The validation unit 220 is further connected to an emergency stop unit 230, which further implements safety interlocks. The unit 220 will initiate an emergency stop, should any emergency button be pressed, or a verification module send an emergency stop command. In particular, the vehicle may perform an emergency stop if any of the checks fails. E.g., the driving may, in that case, be based on the curvature profile of the last valid trajectory by switching to a distance-based matching instead of a time-based matching. When a failure is detected, the safety interlocks switch the system to a safe mode, in which the vehicle reverts to a conservative regime to mitigate the risk of accident.

The second processing system 200 further includes lidar diagnosis units 202, which are connected to respective lidars 21, 22. The diagnosis units 202 are connected to a lidar misalignment detection unit 216, which forms part of the auxiliary perception unit 210. The validations proceed as long as the misalignment detection unit 216 permits and as long as no collision is detected, provided the vehicle states are duly verified.

2.2 Preferred Core Flow

FIG. 3 shows a preferred flow of the main steps of the method. General step S10 concerns computations performed at the first processing system 100. At step S12, the main perception is formed (and then repeatedly updated) based on signals from all perception sensors (i.e., lidars and cameras in FIG. 2). The vehicle states are estimated at step S14, which in practice is performed concurrently with step S12, notwithstanding the depiction. Outcomes of steps S12 and S14 are used by the motion planner to compute S16 initial trajectories.

General step S20 concerns computations performed at the second processing system 200. Such computations decompose into two main operations, which aim at forming and updating the auxiliary perception S26, and validating S24 the initial trajectories based on auxiliary perception formed. Keep in mind that the overall process is iterated, such that steps S24 and S26 are intertwined. That is, the initial trajectories, as computed at step S16 are validated based on the auxiliary perception formed at step S26 but the auxiliary perception is updated based on vehicle states as validated during a previous cycle. Such a scheme requires a proper initialization. A simple initialization scheme is to suppress validation of the trajectory during the very first few cycles, such that the auxiliary perception will be initialized based on vehicle states as initially computed by the first processing system.

Once the normal regime is achieved, i.e., after a few cycles, the vehicle states are verified at step S242, based on the vehicle pose (and optionally the speed) as captured in the auxiliary perception; the validation unit then verifies S244 that the trajectories as computed by the first processing system are collision-free, using the auxiliary perception. At step S262, the vehicle pose is updated and embedded in the auxiliary perception (i.e., the current grid), using the last validated vehicle state. The world representation can then be updated S264 based on lidar signals. To that aim, concurrent grids are obtained from respective lidars and then merged into a single grid. Cell changes are validated using time-redundant information and the cells are reset to the unknown state after some cycles, should no information be available anymore. The validated trajectories are eventually forwarded S28 to the DbW system, with a view to implementing S30 the corresponding commands and accordingly actuating the vehicle 10.

Comments are in order. FIG. 3 does not depict steps related to auxiliary procedures, starting with initializations and emergency procedures. As noted in the previous section, any failure at step S242 or S244 would switch the system to a safe mode and, e.g., trigger an emergency stop. Besides, the reader should keep in mind that the flow shown in FIG. 3 is purposely simplified. In particular, some of the operations performed at steps S10 and S20 are actually performed in parallel, notwithstanding the linear flow shown in FIG. 3. In particular, operations performed at step S10 start before completion of step S264. However, step S242 is performed based on the latest state of the vehicle, as estimated at step S14. Similarly, step S244 is performed using the latest trajectory computed at step S16, and the pose vehicle update S262 is performed based on the latest state validation S242.

2.3 Particularly Preferred Embodiments

In preferred embodiments, the grid map generator 214 calculates a global occupancy grid map for each of the time points corresponding to a given trajectory, as forwarded by the first processing system. The grid map generator 214 provides a local slice based on the current vehicle position obtained from the ego check S242 to the validation unit 220, for validation purposes. The global grid map is determined in two steps: First, a radial grid map is created separately for each lidar. After that, the radial grid maps of all lidars are merged into a global cartesian grid map. Each cell can have one of three states: known free, known occupied, and unknown (e.g., due to occlusion). The vehicle pose checker 212 allows redundancy checks. I.e., the vehicle pose checker 212 receives and buffers the state estimates from the state estimation unit 104. As soon as a new grid map is received from the grid map generator 214, the corresponding state as determined by a corresponding time point (timestamp) is fetched from a memory buffer and the vehicle pose is checked against the grid map. The check includes verifying the speed and direction of motion by comparing the pose information of a few consecutive poses against the speed signals of the vehicle 10 and its orientation. If the check is successful, the state is sent to the validation unit 220, for validation purposes. Alternatively, the validation unit 220 may assumes this check to be successful, by default, such that validations would proceed until the vehicle pose checker 212 informs that the states are no longer validated, as noted in Section 1. Furthermore, each validated state is sent to the grid map generator 214, which adjusts the local slice of the global grid map based on the validated vehicle position. The validation unit 220 checks the trajectory calculated in the motion planner to ensure it is safe, i.e., free of collisions. This is done based on the verified pose, the speed of the car, the occupancy grid map, the verified object list, the map of the surroundings, and the calculated trajectory. The unit 220 further initiates an emergency stop if any emergency button is pressed or if any component sends an emergency stop drive command. Furthermore, the validation unit ensures proper time synchronization across all connected units as well as a proper communication between all of such units based on timeout signals.

Figure 5A:
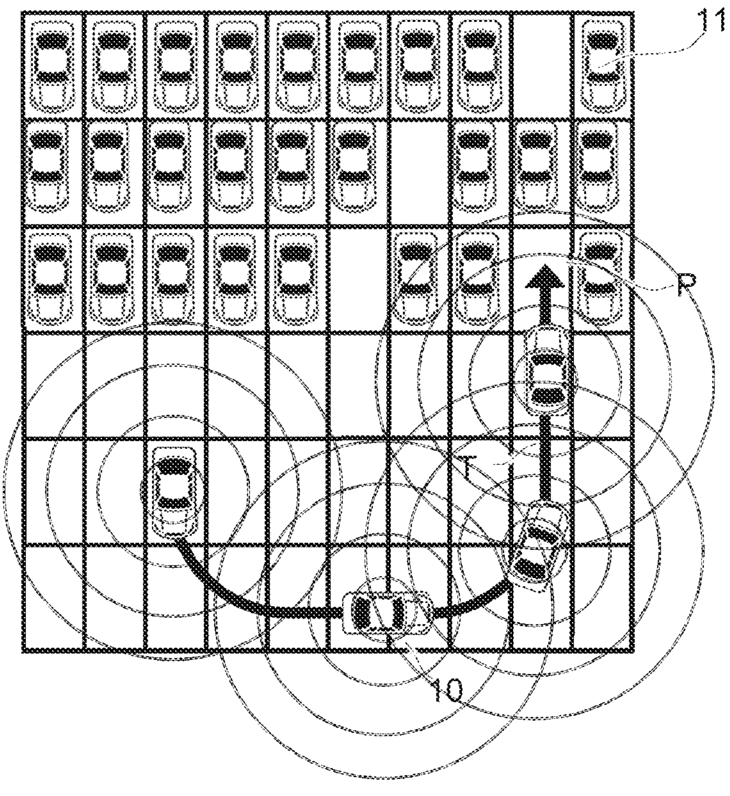
FIG. 5A schematically represents atop view of an industrial parking lot, where an autonomous car exploits detection signals to plan a trajectory to a destination position in the parking lot, as in embodiments.
Figure 5B:
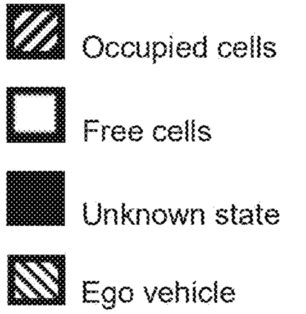
FIG. 5B shows a 2D occupancy grid of the industrial parking lot of FIG. 5A, as generated as a given time point, according to embodiments. In this example, the grid further embeds representations of the car at successive time points along the planed trajectory. Cones are superimposed on the occupancy grid, which reflects corridors corresponding to partial trajectories of the car; such cones are used to verify that the planned trajectory is collision-free, as in embodiments.
Figure 5B:
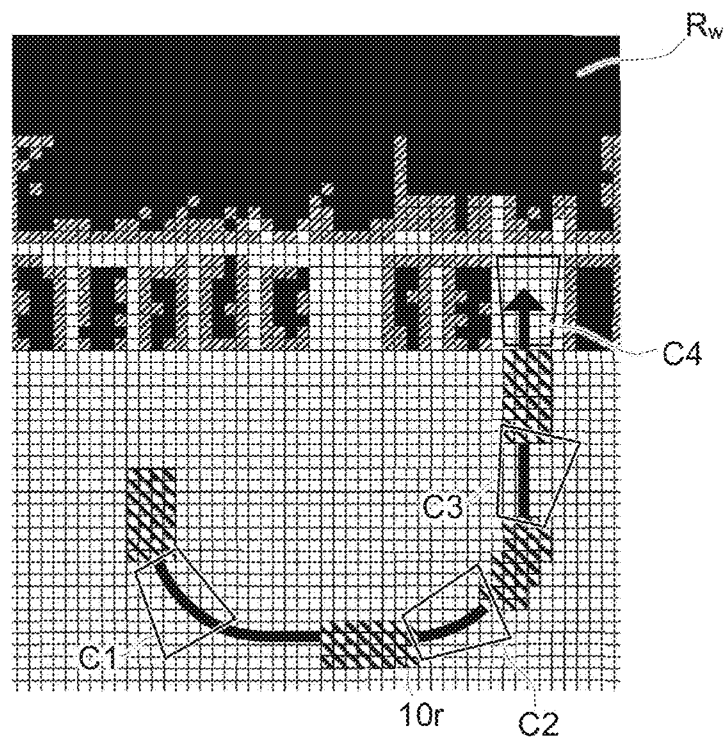
Figure 5C:
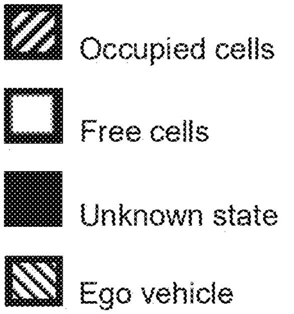
FIG. 5C shows a 2D occupancy grid similar to that of FIG. 5B, except that an obstacle happens to be detected. This obstacle intersects one of the cones, which causes to interrupt the automated car motion, as in embodiments.
Figure 5C:
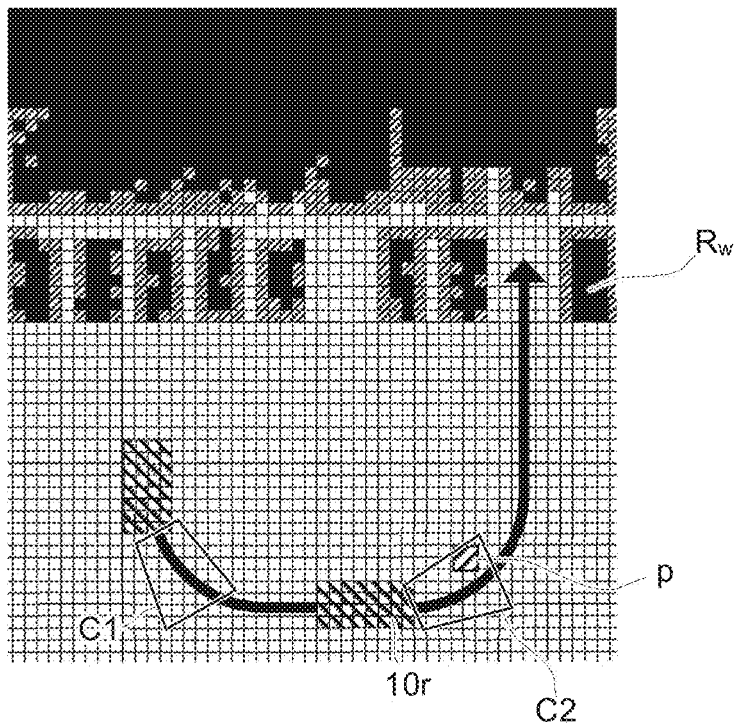

FIG. 5A illustrates an example of application, where an autonomous car 10 exploits its own detection signals to plan a vehicle trajectory T and automatically drive to a given parking place P in a parking lot. Care should be taken not to collide with any obstacle, including other vehicles 11 that are already parked in the parking lot. The trajectory T is the trajectory as initially planned by the first processing system.

FIG. 5B shows a 2D occupancy grid of the surroundings of the vehicle 10 (corresponding to the industrial parking lot of FIG. 5A), as generated as a given time point. The generated grid embodies the auxiliary perception computed by the second processing system at a given time point. The image shown in FIG. 5B embeds representations of the car 10 at successive time points along the planed trajectory T, for convenience. In reality, each local grid (as generated at each time point) only includes one representation of the ego vehicle at a time. Additional geometric objects (the trajectory T and cones) are superimposed on the depicted grid, as a guide for the eyes.

The cones C1-C4 reflect corridors corresponding to partial trajectories of the car, i.e., the partial trajectories that the car 10 is supposed to follow from the positions corresponding to the vehicle poses depicted. Such cones are formed by the validation system using heuristics, based on the initial trajectories and states of the vehicles, and are used to verify that the planned trajectories are collision-free, at each time point. Note, the reader should keep in mind that, in reality, neither the trajectory T nor the not the cones C1-C4 need be integrated in the generated grids.

In the example of FIG. 5B, the trajectories of the car 10 are validated by the validation unit, at each time point, because the generated cones do not intersect with any obstacle, according to the world representation $R_w$ captured in the grids. FIG. 5C illustrates a different scenario, where an obstacle (e.g., a pedestrian) happens to be detected, which intersects the cone C2 that is projected from the second car pose depicted. This invalidates the initial trajectory and triggers a fallback procedure (e.g., an emergency stop). The reader should keep in mind that FIG. 5C attempts to provide a pedagogical example. In reality, the trajectories provided by the motion planning units are refreshed at a sufficiently high frequency, so that the first processing system should normally be able to detect the pedestrian and accordingly correct the trajectory. Note, in practice, the frequency at which validations are performed are commensurate with or equal to the frequency at which the trajectories are refreshed.

The validation unit 220 builds the cones based on trajectories and the world representation $R_w$. Each cone has to be free of obstacles to ensure a safe trajectory. Different types of objects (obstacles) may trigger different assumptions. In particular, simulations can be triggered for moving objects such as pedestrians. The velocity is taken into account, too. The faster the ego vehicle 10, the longer the cone (in polar coordinates). One cone is computed at each time point, where each time point corresponds to a timestamped time step. A decision is made by the unit 220, at each time step, based on the cone corresponding to the current timestep.

3. Technical Implementation Details

Computerized devices can be suitably designed for implementing embodiments of the present invention as described herein. In that respect, it can be appreciated that the methods described herein are at least partly non-interactive, i.e., automated. Automated parts of such methods can be implemented in software, hardware, or a combination thereof. In exemplary embodiments, automated parts of the methods described herein are implemented in software, as a service or an executable program (e.g., an application), the latter executed by suitable digital processing devices.

In the present context, each unit is preferably mapped onto a respective processor (or a set of processor cores) and each processing system 100, 200 is preferably implemented as a respective computer.

A suitable computer will typically include at least one processor and a memory (possibly including several memory units) coupled to one or memory controllers. Each processor is a hardware device for executing software, as e.g., loaded in a main memory of the device. The processor, which may in fact comprise one or more processing units (e.g., processor cores), can be any custom made or commercially available processor, likely subject to some certification.

The memory typically includes a combination of volatile memory elements (e.g., random access memory) and nonvolatile memory elements, e.g., a solid-state device. The software in memory may include one or more separate programs, each of which comprises an ordered listing of executable instructions for implementing logical functions. The software in the memory captures methods described herein in accordance with exemplary embodiments, as well as a suitable operating system (OS). The OS essentially controls the execution of other computer (application) programs and provides scheduling, input-output control, file and data management, memory management, and communication control and related services. It may further control the distribution of tasks to be performed by the processors.

The methods described herein shall typically be in the form of executable program, script, or, more generally, any form of executable instructions.

In exemplary embodiments, each computer further includes a network interface or a transceiver for coupling to a network (not shown). In addition, each computer will typically include one or more input and/or output devices (or peripherals) that are communicatively coupled via a local input/output controller. A system bus interfaces all components. Further, the local interface may include address, control, and/or data connections to enable appropriate communications among the aforementioned components. The I/O controller may have additional elements, which are omitted for simplicity, such as controllers, buffers (caches), drivers, repeaters, and receivers, to allow data communication.

When a computer is in operation, one or more processing units executes software stored within the memory of the computer, to communicate data to and from the memory and/or the storage unit (e.g., a hard drive and/or a solid-state memory), and to generally control operations pursuant to software instruction. The methods described herein and the OS, in whole or in part are read by the processing elements, typically buffered therein, and then executed. When the methods described herein are implemented in software, the methods can be stored on any computer readable medium for use by or in connection with any computer related system or method.

Computer readable program instructions described herein can be downloaded to processing elements from a computer readable storage medium, via a network, for example, the Internet and/or a wireless network. A network adapter card or network interface may receive computer readable program instructions from the network and forwards such instructions for storage in a computer readable storage medium interfaced with the processing means. All computers and processors involved are synchronized, thanks to timeout messages.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the computerized devices, methods of operating it, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently, or still in a reverse order, depending on the functions involved and the algorithm optimization retained. It is also reminded that each block and combinations thereof can be adequately distributed among special purpose hardware components.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention is not limited to the particular embodiments disclosed, but that the present invention will include all embodiments falling within the scope of the appended claims. In addition, many other variants than explicitly touched above can be contemplated. For example, further initialization or emergency procedures may be involved, which are not described in this document.

The invention claimed is:

1. An autonomous vehicle comprising:
a drive-by-wire (DbW) system;
a set of perception sensors; and
two processing systems including:
a first processing system, which is configured to
form a main perception of surroundings of the autonomous vehicle based on signals from each of the perception sensors, whereby semantics are assigned to sensory data captured by the signals from each of the perception sensors, in operation,
estimate states of the vehicle based on feedback signals from the DbW system, and
compute trajectories for the autonomous vehicle based on the perception formed and the estimated states, and
a second processing system, which is configured to
form an auxiliary perception of surroundings of the autonomous vehicle based on signals from only a subset of the perception sensors, whereby semantics are assigned to sensory data captured by the signals from only the subset of the perception sensors, in operation,
validate the trajectories computed by the first processing system based on the auxiliary perception formed by performing redundancy checks, wherein said redundancy checks are heterogeneous redundancy checks, due to heterogeneity of signals used to form the main perception and the auxiliary perception, and
cause to forward the validated trajectories to the DbW system.

2. The autonomous vehicle according to claim 1, wherein the second processing system is further configured to
form said auxiliary perception as a global representation, which includes a world representation and embeds a representation of the autonomous vehicle,
validate, at each time point of a sequence of time points, the estimated states based on the auxiliary perception as formed at one or more previous one of the time points, whereby the computed trajectories are further validated based on the validated states, in operation, and
update, at said each time point, both the world representation, based on said signals from the subset of sensors, and the representation of the autonomous vehicle, based on states of the vehicle as previously validated at one or more previous ones of the time points.

3. The autonomous vehicle according to claim 2, wherein the first processing system includes:
a main perception unit, which is connected to each of the sensors and is configured to form the main perception;
a state estimation unit, to which the DbW system is connected, and which is configured to estimate the states of the vehicle; and
a motion planning unit, which is configured to compute said trajectories, and
the second processing system includes:
an auxiliary perception unit, which is configured to form said auxiliary perception; and
a validation unit, which is configured to validate the computed trajectories and cause to forward the validated trajectories to the DbW system.

4. The autonomous vehicle according to claim 3, wherein the validation unit is configured to validate the computed trajectories by verifying that the computed trajectories are collision-free, based on said world representation, under the condition that the estimated states are validated.

5. The autonomous vehicle according to claim 3, wherein the autonomous vehicle further comprises sets of processors, each of the sets comprising one or more processors, and
the main perception unit, the state estimation unit, the motion planning unit, the auxiliary perception unit, and the validation unit, are mapped onto respective ones of the sets of processors.

6. The autonomous vehicle according to claim 5, wherein the first processing system and the second processing system are implemented as distinct computers of the autonomous vehicle.

7. The autonomous vehicle according to claim 3, wherein the auxiliary perception unit is configured to run:
an occupancy grid map generator designed to generate occupancy grids for successive ones of said time points based on signals obtained from said subset of perception sensors, the occupancy grids capturing said global representation; and
a vehicle pose checker, which is designed to validate the estimated states of the vehicle by comparing a first pose of the vehicle corresponding to the estimated states with a second pose of the vehicle as captured in said occupancy grids by the representation of the autonomous vehicle.

8. The autonomous vehicle according to claim 7, wherein the vehicle pose checker is designed to validate the estimated states of the vehicle by comparing first speeds of the vehicle as captured by the estimated states with second speeds of the vehicle as captured in said occupancy grids by at least two successive representations of the autonomous vehicle at two or more successive ones of the time points.

9. The autonomous vehicle according to claim 7, wherein the occupancy grid map generator is designed to update, at said each time point, a current grid of the occupancy grids based on the first pose as validated by the vehicle pose checker at one or more previous ones of the time points, so as to update the representation of the autonomous vehicle in the current grid.

10. The autonomous vehicle according to claim 9, wherein
the occupancy grid map generator is designed to update the current grid of the occupancy grids based on the first pose as validated by the vehicle pose checker at one or more immediately preceding ones of the time points.

11. The autonomous vehicle according to claim 9, wherein
the validation unit is configured to validate the computed trajectories by verifying that such trajectories are collision-free according to said occupancy grids, provided that the poses of the vehicle, are validated by the vehicle pose checker.

12. The autonomous vehicle according to claim 11, wherein
the set of perception sensors include one or more lidars and one or more cameras, while said subset of perception sensors include the one or more lidars but does not include any of the one or more cameras.

13. The autonomous vehicle according to claim 12, wherein the one or more lidars involve a plurality of lidars, and the occupancy grid map generator is designed to obtain each occupancy grid of said occupancy grids by independently obtaining concurrent occupancy grids based on signals obtained from distinct ones of the lidars and then merging the concurrent occupancy grids obtained into said each occupancy grid.

14. The autonomous vehicle according to claim 13, wherein the occupancy grid map generator is configured to obtain said concurrent occupancy grids in polar coordinates and then merge the concurrent occupancy grids obtained into said each occupancy grid, the latter defined in cartesian coordinates.

15. The autonomous vehicle according to claim 13, wherein said each occupancy grid comprises cells that can have different cell states, the latter including an occupied state and a free state, and the occupancy grid map generator is further designed to update cell states of cells of the occupancy grids based on time-redundant information obtained for the cells, whereby a change to any cell state is taken into account by the occupancy grid map generator only if information characterizing this change is observed twice in a row for two successive ones of said time points.

16. The autonomous vehicle according to claim 15, wherein the cell states further include an unknown state, in addition to said occupied state and said free state, and the occupancy grid map generator is configured to implement a reset mechanism to reset the state of any cell, for which no information can be obtained for a given time period or a given number of successive ones of the grids, to the unknown state.

17. The autonomous vehicle according to claim 15, wherein the occupancy grids are updated at a frequency that is between 6 Hz and 18 Hz.

18. A method of driving an autonomous vehicle, the autonomous vehicle comprising a drive-by-wire (DbW) system, a set of perception sensors, and two processing systems, the latter including a first processing system and a second processing system, wherein the method comprises, at the first processing system, forming a main perception of surroundings of the autonomous vehicle based on signals from each of the perception sensors, whereby semantics are assigned to sensory data captured by the signals from each of the perception sensors, estimating states of the vehicle based on feedback signals from the DbW system, and computing trajectories for the autonomous vehicle based on the formed perception and the estimated states, and the method further comprises, at the second processing system, forming an auxiliary perception of surroundings of the autonomous vehicle based on signals from only a subset of the perception sensors, whereby semantics are assigned to sensory data captured by the signals from only the subset of the perception sensors, validating the trajectories computed by the first processing system based on the auxiliary perception formed by performing redundancy checks, wherein said redundancy checks are heterogeneous redundancy checks, due to heterogeneity of signals used to form the main perception and the auxiliary perception, and causing to forward the validated trajectories to the DbW system.

19. A non-transitory computer program product for driving an autonomous vehicle comprising a drive-by-wire (DbW) system, a set of perception sensors, and two processing systems, the computer program product comprising a non-transitory computer readable storage medium having program instructions embodied therewith, the program instructions executable by processing means of the two processing systems, to cause a first processing system of the two processing systems to form a main perception of surroundings of the autonomous vehicle based on signals from each of the perception sensors, whereby semantics are assigned to sensory data captured by the signals from each of the perception sensors, in operation, estimate states of the vehicle based on feedback signals from the DbW system, and compute trajectories for the autonomous vehicle based on the perception formed and the estimated states, and a second processing system of the two processing systems to form an auxiliary perception of surroundings of the autonomous vehicle based on signals from only a subset of the perception sensors, whereby semantics are assigned to sensory data captured by the signals from only the subset of the perception sensors, in operation, validate the trajectories computed by the first processing system based on the auxiliary perception formed by performing redundancy checks, wherein said redundancy checks are heterogeneous redundancy checks, due to heterogeneity of signals used to form the main perception and the auxiliary perception, and forward the validated trajectories to the DbW system.

* * * * *